United States Patent [19]
Goodson

[11] Patent Number: 5,359,658
[45] Date of Patent: Oct. 25, 1994

[54] KEY MARKING OVERLAY FOR ALPHANUMERIC KEYPADS

[75] Inventor: Jonathan M. Goodson, Beverly Hills, Calif.

[73] Assignee: Mark Goodson Games, Inc., Los Angeles, Calif.

[21] Appl. No.: 103,296

[22] Filed: Aug. 6, 1993

Related U.S. Application Data

[63] Continuation of Ser. No. 827,144, Jan. 28, 1992, abandoned.

[51] Int. Cl.5 .............................................. H04M 1/00
[52] U.S. Cl. ...................................... 379/447; 379/450
[58] Field of Search ......................... 379/434, 368–370, 379/451, 447, 450; 341/22, 21, 27, 34

[56] References Cited

U.S. PATENT DOCUMENTS

| | | |
|---|---|---|
| 2,413,974 | 1/1947 | Hultgren . |
| 2,889,413 | 6/1959 | Steele . |
| 3,073,909 | 1/1963 | Tilden . |
| 3,491,221 | 1/1970 | Zamarra . |
| 3,739,105 | 6/1973 | Anson . |
| 3,927,282 | 12/1975 | Firstenberg . |
| 4,063,046 | 12/1977 | Schiffman et al. . |
| 4,438,300 | 3/1984 | Morse . |
| 4,555,600 | 11/1985 | Morse . |
| 4,866,764 | 9/1989 | Barker, III . |
| 5,011,728 | 4/1991 | Imae et al. . |
| 5,140,632 | 8/1992 | Anten . |

Primary Examiner—James L. Dwyer
Assistant Examiner—Jack Chiang
Attorney, Agent, or Firm—Henry M. Bissell

[57] ABSTRACT

A key marking overlay for telephone keypads. The overlay is mountable over the telephone keypad and allows pressing of the keys through the overlay. It provides a mechanism for keeping track of the keys which have been pressed during period of use of the keypad. The overlay may also present graphical indicia assigning arbitrary functions to selected keys of the keypad.

18 Claims, 2 Drawing Sheets

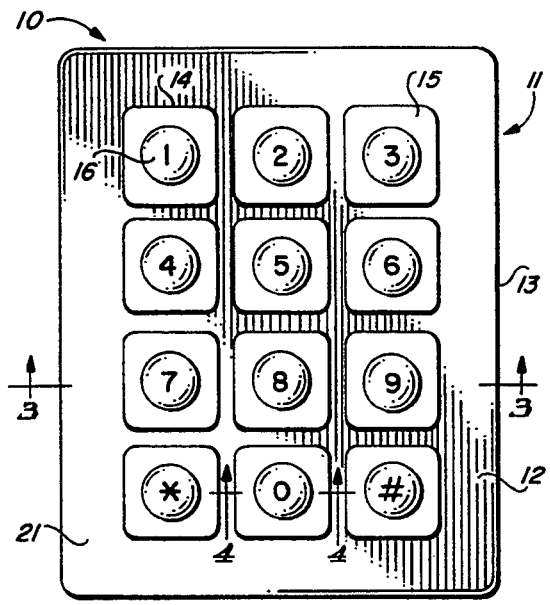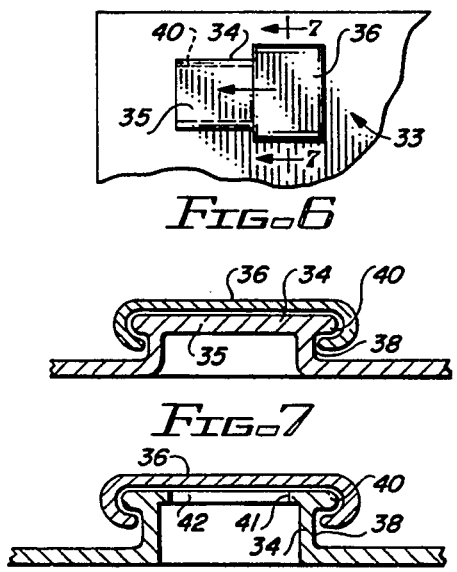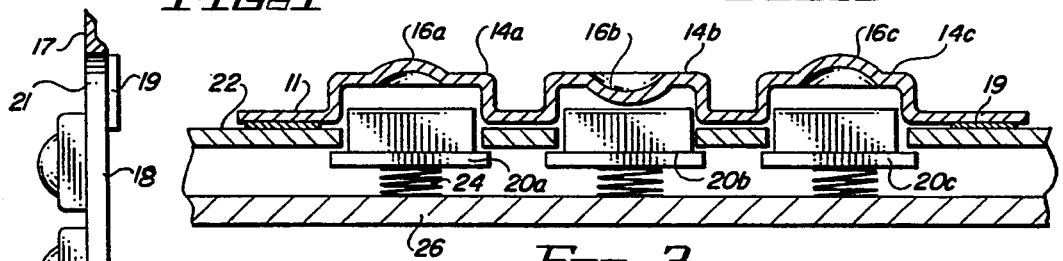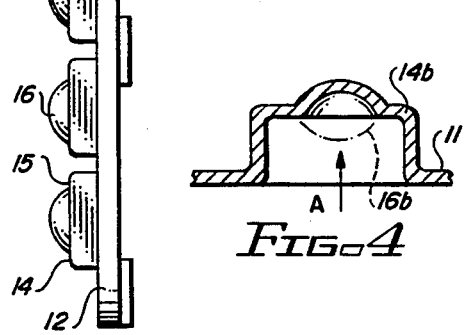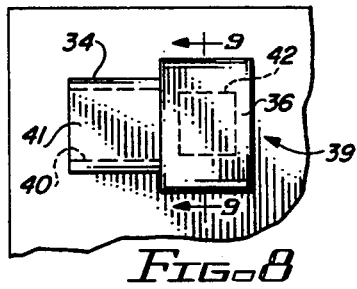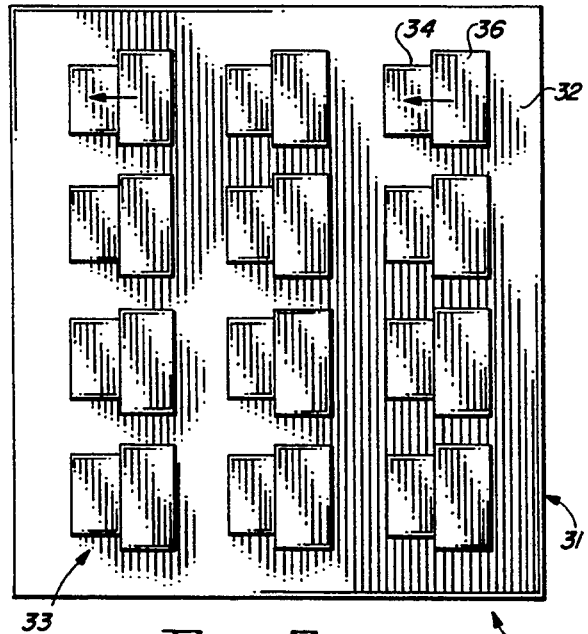

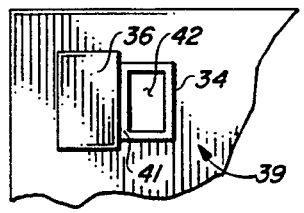
FIG_10
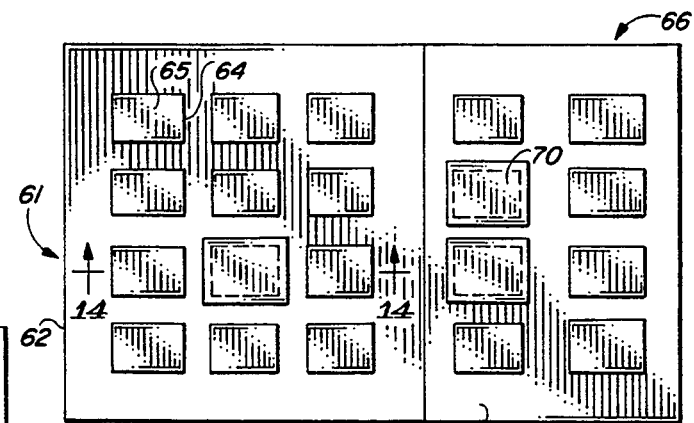
FIG_13
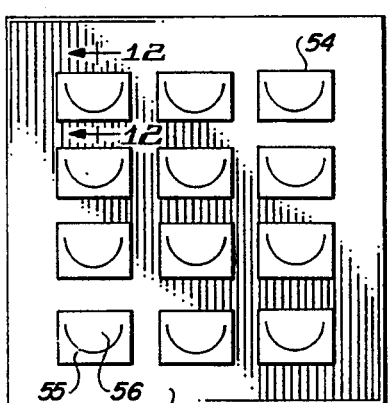
FIG_11
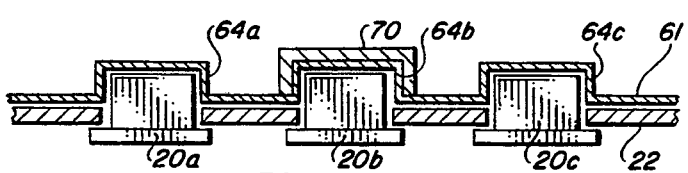
FIG_14
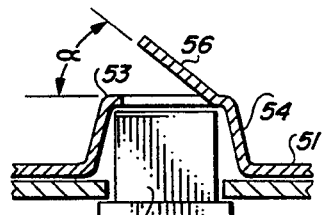
FIG_12
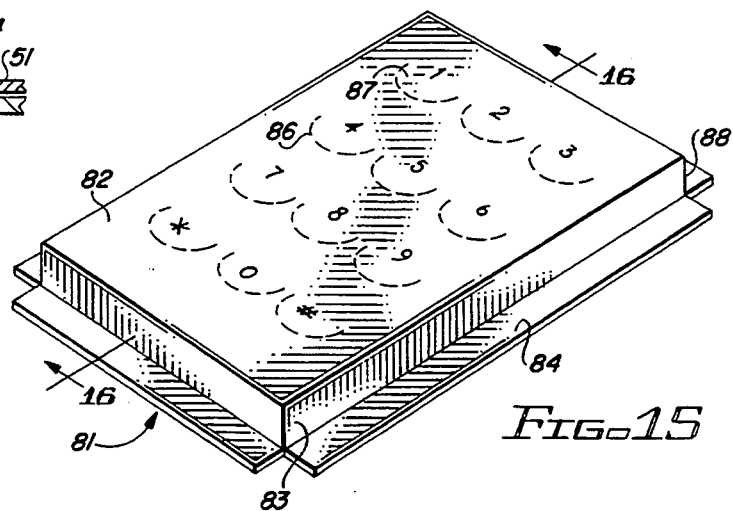
FIG_15
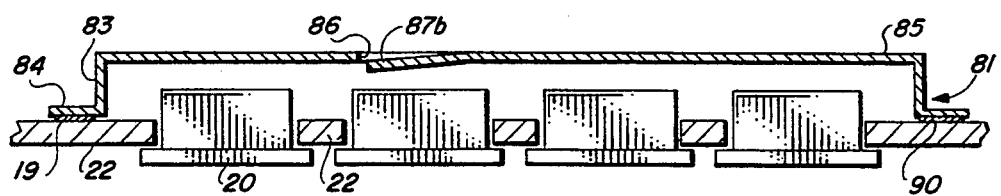
FIG_16

KEY MARKING OVERLAY FOR ALPHANUMERIC KEYPADS

This is a continuation of application Ser. No. 07/827,144, filed Jan. 28, 1992, now abandoned.

BACKGROUND OF THE INVENTION

1. Field of the Invention

This invention relates to the field of templates and overlays for keys and keypads and, more particularly, to overlays for a touchtone telephone keypad.

2. Description of the Related Art

Keypads have been in use for many years on a wide variety of equipment, such as calculators, both mechanical and electrical or electronic, touchtone telephones, computer keyboards and many other devices. Commonly referred to as "numeric" or "alphanumeric"—the latter because it designates the use of keys with both alphabetical and numeric functions—an alphanumeric keypad is generally understood to encompass other symbols as well, such as the star or asterisk (*) and the pound or number sign (#) on a telephone keypad. Overlays for alphanumeric keypads have been developed for protection (to protect the keys and the underlying circuitry from vandalism, dirt and other environmental damage), for key enhancement, such as enlarging the effective touch area for key manipulation, and for numerous other purposes.

The known related art is exemplified by patents U.S. Pat. No. 3,491,221 to Zamarra and U.S. Pat. Nos. 4,438,300 and 4,555,600, both to Morse, all of which are exclusively concerned with protecting telephone keypads from dirt, liquid spills or vandalism. Insofar as is known, the existing related art provides no means for adapting telephone keypads to new uses. While recent technical advances have created new telephone features and a host of telephone services, such as the so-called "900"-number services, very little development of an innovative nature has occurred in the field to which the present invention relates.

SUMMARY OF THE INVENTION

The present invention is intended to be used with a standard-type touchtone telephone, but it can be adapted to accommodate a wide range of telephone sets of different shapes and sizes and with differently configured alphanumeric keypads.

In particular arrangements in accordance with the present invention, a template or overlay is provided for a standard push button, or touchtone telephone keypad. The key marking overlay is adapted for mounting on a touchtone telephone in a fashion such that it overlies the whole keypad area. Depending on the particular embodiment of the invention and on the type of touchtone telephone used, the key marking overlay may be attached to the telephone by means of a releasable adhesive, as for example an adhesive strip, by mating Velcro strips, or by any other suitable means. If used on a substantially stationary desk-top type telephone set, the force of gravity may suffice to hold the key marking overlay in place.

Embodiments of the invention are intended for a particular field of use: assisting a user in interacting with a called party by using the telephone keypad to make choices of alternatives offered by the called party over the telephone voice channel. This may, for example, involve "playing a game" with the party on the other end of the phone connection or engaging in a contest where prizes might be awarded for a predetermined sequence of correct responses. One anticipated application of the invention relates to calls to special numbers wherein the phone company assesses a special use charge against the calling party and remits part of this to the called party. At the present time, this is common for calls to a 900 "area code"; i.e., by dialing "900" followed by the number assigned to the particular party to be called. (In this sense, "dialing" is intended to encompass using a keypad to "dial" or input the number.) Another contemplated use of embodiments of the invention is in participating in poll taking by phone, in which case the user might be the called party, with the user wishing to keep track of indicated answers to questions posed by the poll interviewer.

Concepts and embodiments of the invention are disclosed and explained herein in the context, as an example only, of use in the calling of 900 numbers. It will be understood that this is merely by way of example and that the scope of the invention is not so limited. Embodiments of the invention can be used in association with telephone instrument keypads in connection with the calling of other numbers and in receiving calls.

The telephone user who desires to play a "900"-number game dials the appropriate sequence of digits, which is 1+900+a seven digit phone number. The telephone key marking template is mounted over the keypad. After the connection to the "900"-number service is made, the game, contest or other interaction can begin. The telephone user might be called upon to answer questions or make game decisions, for example, by depressing certain keys.

Concurrently, he manipulates the overlay to develop an indication of the keys which have been pressed. As an example, the telephone user may be told, by a recorded message or by an operator who is conducting the "900"-number game with the telephone user, which keys to press dependent upon what the telephone user's answers to these questions are. Also the telephone user might be instructed that the keys have new meanings or functions. For example, the telephone user might be told that the "7" key means "up", or the "0" key means "fire the torpedo", or the "9" key means "open the door", or the "2" key means "no", etc. Alternatively, the overlay itself may define certain arbitrary functions related to the pressing of selected keys. For example, text or graphic indicia on the overlay may assign the function "up" to key No. 7. This is separate and apart from the capability of the overlay to provide a record of which keys have been pressed during use of the overlay.

Certain "900"-number applications may require the telephone user to keep track of which keys he has depressed during a certain series of steps. This tracking or "recording" can be accomplished by utilization of the various indicating means employed in the different embodiments of the present invention.

In one embodiment of the invention such tracking or "recording" can be accomplished if the telephone user presses a key which is covered by a key marking overlay, consisting of an elastomeric sheet with individual pockets and convex elevations on the upper side of these pockets. When the key is pressed the convex elevation is pressed downward, it changes its form and becomes a concave depression.

By utilizing the described tracking features, the telephone user is able to keep track of which one or more keys have been depressed during use of the keypad.

After the game or other utilization is ended, the key marking overlay can be removed, if desired. Dependent on the particular embodiment used, the overlay may be restored to its original form, for example by applying pressure to the concave depressions from the underside of the overlay body. Other embodiments, for example a cardboard overlay with perforated flaps that may be pressed downward or lifted upward to "record", may be for one-time-use only and can be disposed of after use, to be replaced with a fresh overlay, if desired. Yet another embodiment comprises an overlay with "slides" in their respective key positions which can be moved to indicate a key press.

It is anticipated that the key marking overlay is mounted on a touch tone telephone at the time or after the telephone user who desires to call a "900"-number game has dialed the full number sequence to get the desired connection. The invention comprises embodiments where the pressing of any key is automatically "recorded", in which case the telephone user would dial first and then mount the key marking overlay on the telephone set. If the telephone user proceeds in this fashion none of the keystrokes used to get the desired connection are "recorded" and the telephone user can begin the "900"-game with a "fresh" key marking overlay. Other embodiments of the invention allow the key marking overlay to be mounted on a telephone set before the telephone user places the call. These embodiments do not automatically "record" the keystrokes, but require a volitional step by the telephone user to "record" or display the occurrence of a keystroke if that is desired. Such a volitional step might be the lifting of a flap or the change of position of an indicator piece. The invention comprises embodiments which are designed and intended for multiple uses, and other embodiments which are disposable and intended to be discarded after use.

BRIEF DESCRIPTION OF THE DRAWING

A better understanding of the present invention may be realized from a consideration of the following detailed description, taken in conjunction with the accompanying drawing, in which:

FIG. 1 is a top plan view of a key marking overlay embodying the invention;

FIG. 2 is an edge view of the key marking overlay of FIG. 1;

FIG. 3 is a sectional view of the arrangement of FIG. 1 taken along the line 3—3 in FIG. 1;

FIG. 4 is a sectional view of a single key element of the arrangement of FIG. 1, taken along the line 4—4 in FIG. 1;

FIG. 5 is a top plan view of an alternative embodiment of the invention;

FIG. 6 is a top plan view of one element of the arrangement of FIG. 5;

FIG. 7 is an enlarged sectional view of the element of FIG. 6, taken along the line 7—7 in FIG. 6;

FIG. 8 is a top plan view of an alternative element that can be used with the arrangement of FIG. 5;

FIG. 9 is an enlarged sectional view of the alternative element of FIG. 8, taken along the line 9—9 in FIG. 8;

FIG. 10 is a top plan view of the alternative element of FIG. 8 showing more detail;

FIG. 11 is a top plan view of another embodiment of the invention;

FIG. 12 is a sectional view of the embodiment of FIG. 11, taken along the line 10—10 in FIG. 9;

FIG. 13 is a top plan view of still another embodiment of the invention;

FIG. 14 is a sectional view of the embodiment of FIG. 13, taken along line 14—14 in FIG. 13;

FIG. 15 is a perspective view of yet another embodiment of the invention; and

FIG. 16 is an enlarged sectional view of the arrangement of FIG. 15 taken along the line 16—16 in FIG. 15.

DETAILED DESCRIPTION OF THE PREFERRED EMBODIMENTS

Turning now to the drawing, FIGS. 1-4 show various details of a first embodiment 10 of the invention. In this embodiment an overlay 11 is formed of an elastomeric sheet 12 which carries a grid of twelve protuberances 14 extending upwardly above a base plane 17. Each protuberance 14 carries a circular convex elevation 16 in its substantially horizontal top portion 15. The overlay 11 is designed to be mounted on a touchtone telephone in a fashion that it covers the keypad. A skirt portion 21, having a border 13 extends from the overlay beyond the keypad. The underside of the skirt portion 18 is provided with means 19 for attachment of the overlay to the telephone set. These means could be one or more strips of releasable adhesive or, in the alternative, the underside of the skirt portion 18 could be equipped with one or more Velcro strips that mate with corresponding Velcro strips attached to the face of the telephone set for securing the overlay 11 in position on the telephone set. If the overlay 11 is used on a standard desk-top telephone set the force of gravity may suffice to keep the overlay in place. For such applications an otherwise identical overlay without adhesive or Velcro could be used.

The keys 20a, 20b and 20c of a conventional keypad are mounted in known fashion in a telephone housing 22 and protrude from the housing through apertures in the housing as shown in FIG. 3. The keys are in known fashion mechanically and electrically connected to the underlying components of the telephone set, as illustrated schematically by the springs 24 and the circuit board 26. The overlay 11 is attached to the housing 22 by means of the adhesive or Velcro strips 19. FIG. 3 shows three keys 20a, 20b, 20c, and three corresponding protuberances 14a, 14b and 14c of the overlay 11. These protuberances have convex elevations 16a and 16c in their respective top portions. FIG. 3 shows the overlay 11 after the telephone user has pressed the middle key 20b. Pressing the middle key 20b changed the convex elevation of protuberance 14b to a concave depression 16b. This concave depression 16b is readily distinguishable from the convex elevations of the other protuberances and thus serves to indicate that the middle key 20b, located within protuberance 14b, has been pressed.

If the overlay 11 is subsequently removed from the telephone set and if pressure (schematically illustrated by arrow A in FIG. 4) is applied to the concave depression 16b from the underside, the concave depression 16b changes its form back to a convex elevation. This allows the telephone user to restore the overlay 11 to its original form after use and to reuse it for interacting with called "900"-numbers.

FIG. 5 shows a first alternative embodiment 30 of the invention. The overlay 31 is formed by an elastomeric sheet 32 which carries a grid of twelve upwardly extending protuberances 34, each carrying a slidable cover piece 36. The indicator covers 36 are also made of flexible elastomeric material which allows the telephone user to activate the telephone keys through the overlay by depressing the slidable covers 36 and the protuberances 34 together. The overlay 31 is designed to be mounted on a telephone set in the manner described above and may be equipped with an adhesive, Velcro strips or other suitable means to keep it in place once mounted on the telephone set.

FIG. 6 shows details of one element 33 of the overlay 31. The sliding cover 36 is mounted on a protuberance 34 which has a closed top portion 35. The cover 36 is laterally slidable on the protuberance from its shown home position to the left side as illustrated by the arrow in FIG. 6. FIG. 7, an enlarged sectional view of element 33 taken along line 7—7 in FIG. 6, shows further details of this arrangement. The protuberance 34 has a substantially flat closed top portion 35 which extends laterally side ways beyond the sidewalls to form a pair of rails or guides 40 on which the indicator piece is slidably mounted for lateral movement to allow the user to "mark" the pressing of a particular key by laterally sliding the indicator piece to the left.

FIGS. 8 and 9 show one element 39 of the overlay 31 which is a variation of the element 33 depicted in FIGS. 6 and 7. FIG. 8 is a top plan view of the element 39 of the overlay 31. The sliding cover 36 is mounted on the protuberance 34 in substantially the same fashion as described with respect to the arrangement of FIGS. 6 and 7. The top portion 41 of the protuberance 34 is, however, not closed, but equipped with an opening 42 that is covered by the sliding cover 36 when the cover is in its home position, as shown in FIG. 8. This arrangement is further illustrated in detail in FIG. 9, which is a sectional view of element 39 taken along line 9—9 in FIG. 8. As long as the sliding cover 36 is in its home position, at the right side of the protuberance 34 (in FIG. 8), the elements 33 and 39 look alike, because the opening 42 is concealed by the cover. When the telephone user desires to "record" or mark the pressing of a particular key, he may slide the cover 36 sideways to the left. This exposes the opening 42 in the top portion 41 of the protuberance 34 as shown in FIG. 10, a top plan view of such an arrangement. The underlying key (not shown here) becomes visible through the opening 42. Thus the exposure of the key and the changed position of the cover 32 together serve to indicate a particular key has been pressed.

FIGS. 11 and 12 show a second alternative embodiment 50 of the invention. In this embodiment the overlay 51 is formed by an elastomeric sheet 52 which carries a grid of twelve upwardly extending protuberances 54. The basic structure of this grid of protuberances 54 resembles substantially the arrangement shown in FIG. 1, except that the top portion 53 of the protuberances 54 of the overlay 51 depicted in FIG. 11 is substantially flat and does not carry convex elevations. The top portions of the protuberances 54 are equipped with semicircular incisions 55 which define movable flaps 56. These flaps 56 can be moved upwards by the telephone user to indicate that a particular key has been pressed. FIG. 12 further illustrates this arrangement and shows a portion of the overlay, mounted to cover a key 20, with the flap 56 being moved upward and forming an angle $\alpha$ with the plane of the overlay. The upward movement of the flap 56 can be effectuated by the telephone user either with a pointed object such as the tip of a pencil or a ball point pen or by lifting the flap up with a finger nail or by any other suitable means. Since the flap 56 and the overlay 51 are of flexible elastomeric material, resilient forces will cause the flap 56 to move downwards again, thus decreasing the angle $\alpha$. The actual size of the angle $\alpha$ is, however, not critical to the proper functions of the overlay as long as $\alpha$ is greater than approximately 10° and the lifting of the flap 56 is visually ascertainable by the telephone user.

FIGS. 13 and 14 show a third alternative embodiment 60 of the invention. In this embodiment 60 the overlay 61 is formed by an elastomeric sheet 62 which carries a grid of twelve upwardly extending protuberances 64. The protuberances 64 have flat closed top proportions 65 without incisions or convex elevations. The mere pressing of a key therefore gives no visible indication that such pressing has actually taken place as is the case with the convex elevations which change to concave depressions as described above. In the embodiment 60 the overlay 61 therefore has an attached skirt portion 66 that carries a plurality of storage protuberances 68 which in their size and shape are substantially identical to the protuberances 64. On these storage protuberances 68 are mounted a plurality of movable separate indicator pieces 70. FIG. 13 shows a skirt portion 66 with eight such storage protuberances 68 and two separate indicator pieces 70 mounted thereon. It is to be understood, however, that both the number of storage protuberances 68 as well as the number of indicator pieces 70, that are to be used with this embodiment 60 of the invention, may vary depending on the particular application, for example the particular "900"-number game or games that the overlay is intended to be used with.

Once the telephone user has pressed a key and desires to "record" or mark the pressing of that particular key, he can remove an indicator piece 70 from the skirt portion 66 and mount it on the protuberance 64 that corresponds to the desired key. FIG. 14 shows an arrangement of three keys 20a, 20b and 20c of a standard touch-tone telephone keypad that are covered in the aforedescribed fashion by an overlay 61. On the protuberance 64b of the overlay 61 is mounted an indicator piece 70, which would indicate that the key 20b has been pressed.

The indicator pieces 70 are preferably made of an elastomeric or otherwise suitably flexible material that facilitates their handling and mounting on the protuberances. It is contemplated that the indicator pieces 70 be made of colored material. Bright colors that contrast well with the elastomeric sheet are preferred because they enhance the indicating function of the pieces 70.

FIGS. 15 and 16 show a fourth alternative embodiment 80 of the invention. The overlay 81 is made of stiff paper or cardboard 82. The four substantially vertical sidewalls 83 of the overlay 81 are glued or otherwise suitably joined together at their respective ends 88 to form a box-like container, shown here with the opening facing down. Sidewalls 83 have extensions 84 extending from the sidewalls 83 laterally at an angle of about 90°. These extensions 84 carry a releasable adhesive 89 at their underside 90 to secure the overlay 81 in position once mounted on the housing 22 of the telephone set.

The numbers and symbols that correspond to the keys of a telephone keypad are printed on the overlay 81. The top proportion 85 of the overlay 81 is substantially flat and comprises twelve perforations 86, corresponding to the twelve keys of a standard telephone keypad. These perforations, which in the illustrated embodiment 80 describe the sector of a circle, but which could also have a different shape, define flaps 87. When the telephone user presses a particular key, the pressure applied breaks the perforation 86 and the flap 87 is pressed downwards. A downwardly pressed flap 87b is shown in FIG. 16. Due to deformation of the fibers of the paper or cardboard overlay 81, the flap 87b will stay down. The downwardly pressed flap 87b is an indication that the key covered by and corresponding to flap 87b has been pressed.

The overlay 81 may be attached to the housing 22 of a touchtone telephone by way of a releasable adhesive 19, or it may be held in place on the telephone set by the force of gravity. It is expected that, rather than using downwardly pressed flaps 87 to indicate that a particular key has been pressed, a telephone user may prefer to pull the flaps 87 upwards with the tip of a pencil, a finger nail or otherwise suitable means, and use the upwardly pulled flaps to mark the pressing of a key in a manner substantially identical as described with respect to the arrangement shown in FIGS. 11-12.

Although there have been described hereinabove various specific arrangements of a key marking overlay for telephone keypads in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A key marking device for telephone keypads, comprising;
    an overlay for covering telephone keypads;
    a skirt portion extending from the overlay beyond the keypad area, the skirt portion having an upper side and an underside;
    a body portion of the overlay including indicating means in the form of a plurality of indicating elements, each of said indicating elements being physically associated with only a single corresponding keypad key, for visually indicating the occurrence of a corresponding key press; and
    means for connecting the overlay to a touchtone telephone in position to cover the keypad thereof.

2. The device of claim 1 wherein the overlay comprises a flexible elastomeric sheet having a grid of upwardly-directed protuberances corresponding in relative position to the keys of a telephone keypad, the protuberances being elastomerically depressible to permit individual displacement of keypad keys when the overlay is in position over a telephone keypad.

3. The device of claim 2 wherein the connecting means comprise at least one strip of releasable adhesive mounted on the underside of the skirt portion, the at least one strip being covered with a removable non-adhesive backing.

4. The device of claim 2 wherein the connecting means comprise at least one pair of Velcro strips, one strip being attached to the underside of the skirt portion.

5. The device of claim 2 wherein the indicating means comprise a convex portion on each protuberance, each of the convex portions being individually deformable to assume a concave depression which is outwardly deformable by pressure from the underside of the sheet to resume the convex configuration.

6. The device of claim 2 wherein the indicating means comprise a plurality of indicator covers slidably mounted on guides formed on the protuberances, the covers being laterally slidable and manually displaceable from a home position to provide an indication of key manipulation.

7. The device of claim 6 further comprising flat upper portions of the protuberances having indicia, the indicia being concealable by the indicator covers and being exposable by lateral displacement of the indicator covers from a home position.

8. The device of claim 2 wherein the indicating means comprise a plurality of curved incisions, one in each protuberance, the incision defining movable flaps which are manipulable to indicate the occurrence of a key press.

9. The device of claim 2 wherein the indicating means comprise a skirt portion configured to define a base carrying a plurality of detachable indicator pieces which are selectively movable to protuberances corresponding to keys which are actuated to provide a record of key press occurrences.

10. The device of claim 1 wherein the overlay body portion comprises a box-like structure of fibrous material, the structure having a flat top portion with sidewalls extending downwardly from the top portion to join with the skirt portion.

11. The device of claim 10 wherein the indicating means comprise a plurality of perforations in the top portion which define a plurality of flaps which are selectively movable out of the plane of the flat top portion to provide an indication of key actuation.

12. The device of claim 11 wherein the overlay comprises cardboard material.

13. The device of claim 11 wherein the overlay comprises stiff paper.

14. The device of claim 11 wherein the flaps are selectively removable to provide an indication of key actuation.

15. The device of claim 2 wherein each of the protuberances comprises an element which is removable to provide an indication of key actuation.

16. The device of claim 1 further including graphical indicia on the overlay for assigning selected functions to correspond to particular keys of an associated telephone keypad.

17. A key marking device for telephone keypads, comprising;
    an overlay for covering telephone keypads;
    a skirt portion extending from the overlay beyond the keypad area, the skirt portion having an upper side and an underside;
    a body portion of the overlay including means for maintaining a record of the occurrence of a key press, said means being in the form of a plurality of indicating elements, each of said indicating elements being physically associated with only a single corresponding keypad key, for visually indicating the occurrence of a corresponding key press; and
    means for connecting the overlay to a touchtone telephone in position to cover the keypad thereof.

18. The device of claim 17 wherein said means for maintaining a record comprises means for maintaining a visible record of the occurrence of a key press.

* * * * *